United States Patent
Leach et al.

(10) Patent No.: US 6,694,447 B1
(45) Date of Patent: Feb. 17, 2004

(54) APPARATUS AND METHOD FOR INCREASING APPLICATION AVAILABILITY DURING A DISASTER FAIL-BACK

(75) Inventors: Judith G. Leach, Hayward, CA (US); Philip J. Crane, Sacramento, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 502 days.

(21) Appl. No.: 09/675,820

(22) Filed: Sep. 29, 2000

(51) Int. Cl.⁷ .............................................. G06F 11/00
(52) U.S. Cl. ................... 714/6; 714/7; 714/15; 707/202
(58) Field of Search .......................... 714/4–7, 11, 13, 714/15; 707/202, 204

(56) References Cited

U.S. PATENT DOCUMENTS

| | | | | |
|---|---|---|---|---|
| 5,555,371 A | * | 9/1996 | Duyanovich et al. | 714/13 |
| 5,592,618 A | * | 1/1997 | Micka et al. | 714/54 |
| 6,078,932 A | * | 6/2000 | Haye et al. | 707/204 |
| 6,212,531 B1 | * | 4/2001 | Blea et al. | 707/204 |
| 6,223,304 B1 | * | 4/2001 | Kling et al. | 714/12 |
| 6,292,905 B1 | * | 9/2001 | Wallach et al. | 714/4 |
| 6,363,497 B1 | * | 3/2002 | Chrabaszcz | 714/13 |
| 6,408,310 B1 | * | 6/2002 | Hart | 707/201 |
| 6,516,394 B1 | * | 2/2003 | Don et al. | 711/162 |
| 6,549,921 B1 | * | 4/2003 | Ofek | 707/202 |

* cited by examiner

Primary Examiner—Scott Baderman
Assistant Examiner—Joshua Lohn
(74) Attorney, Agent, or Firm—Blakely, Sokoloff, Taylor & Zafman (57) ABSTRACT

The present invention provides a method and apparatus for increasing availability of an application during fail-back from a secondary site to a primary site following a failure at the primary site. The method includes copying data from active storage volumes to secondary storage volumes of the secondary site while the application runs on the secondary site and updates the active storage volumes. Once the secondary storage volumes of the secondary site are updated, the data is re-synchronized from the secondary storage volumes of the secondary site to the primary storage volumes of the primary site. The steps of copying the data and resynchronizing the data are repeated for data updated by the application, during the resynchronization, until a time required to complete the resynchronization step for the updated data is within an acceptable downtime for the application. Once this step is complete, the application is failed-back to the primary site by bringing up the application at the primary site.

23 Claims, 12 Drawing Sheets

APPARATUS AND METHOD FOR INCREASING APPLICATION AVAILABILITY DURING A DISASTER FAIL-BACK

FIELD OF THE INVENTION

The invention relates generally to the field of remote storage replication. More particularly, the invention relates to a method and apparatus for increasing application availability during a disaster fail-back.

BACKGROUND OF THE INVENTION

Application downtime following a server failure represents an increasing problem due to the widespread use of computerized applications as well as the ever-expanding electronic commerce-driven economy. To increase data availability and reduce application down time, customers typically build a disaster recovery site which can take over during a disaster or server failure. A significant amount of time and planning goes into insuring that following a disaster, fail-over occurs as rapidly as possible. To this end, many vendors provide methods to reduce this downtime.

Remote storage replication is a technique which is primarily used for disaster protection. The processes are optimized by vendors to expedite the fail-over process from a primary site to a secondary or disaster recovery site. A problem that is less frequently looked at, however, is the time to return the operations to the primary site once the problems causing the fail-over have been resolved.

Customer Service Level Agreements (SLAs) define the level of service provided to customers and typically state the amount of downtime acceptable when a disaster strikes. However, customer SLAs rarely provide the requirements for returning operations to the original site once the problem has been resolved. With this in mind, most companies offer solutions that minimize the fail-over process but pay less attention to the requirements of retrieving the state of the primary site (fail-back). In addition, conventional fail-back processes are rarely, if ever, tested under real, live conditions. During such customer testing, the fail-over process is likely to be well-documented. Scripts are generally written and seem to work as efficiently as possible. However, on conclusion of the fail-over process testing, operations continue on the primary site without having had the need to restore the data replicated to the secondary site.

Conventional fail-back processes are lengthy and often require the entire population of the data from the secondary site back to the primary site. These processes, if ever required, can be time consuming and involve a fair amount of application unavailability or down time. Conventional fail-back processes often require complete resynchronization of the data to get back the data to the primary server and depending on the size of the data, this can be a very long process, adding to the amount of application downtime.

SUMMARY OF THE INVENTION

The present invention provides a method and apparatus for increasing availability of an application during fail-back from a secondary site to a primary site following a failure at the primary site. The method includes copying data from active storage volumes to secondary storage volumes on the secondary site while the application runs on the secondary site and updates the active storage volumes. Once the secondary storage volumes of the secondary site are updated, the data is re-synchronized from the secondary storage volumes on the secondary site to the primary storage volumes of the primary site. The steps of copying the data and resynchronizing the data are repeated for data updated by the application, during the re-synchronization, until a time required to complete the resynchronization step for the updated data is within an acceptable downtime for the application. Once this step is complete, the application is failed-back to the primary site by bringing up the application at the primary site. Application availability is therefore increased by limiting the application downtime to an acceptable down time.

BRIEF DESCRIPTION OF THE DRAWINGS

The present invention is illustrated by way of example, and not by way of limitation, in the figures of the accompanying drawings and in which.

DETAILED DESCRIPTION

The present invention provides a method and apparatus for increasing availability of an application during fail-back from a secondary site to a primary site following a failure at the primary site. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices not needed for an understanding of this invention are shown in block diagram form to avoid obscuring the invention.

The present invention describes a technique for increasing application availability during a disaster fail-back. According to one embodiment, the technique described by the present invention is utilized during a fail-back from a secondary site to a primary site following a failure at the primary site. The method includes copying data from active storage volumes to secondary storage volumes on the secondary site while the application runs on the secondary site and updates the active storage volumes. Once the secondary storage volumes of the secondary site are updated, the data is resynchronized from the secondary storage volumes of the secondary site to the primary storage volumes of the primary site. During this resynchronization process, the application is active and continues updating the active storage volumes. The steps of copying the data and resynchronizing the data are repeated for data updated by the application, during the re-synchronization, until a time required to complete the resynchronizing step for the updated data is within an acceptable downtime for the application. Once this step is complete, the application is failed-back to the primary site by bringing up the application at the primary site. Application availability is increased as a result of limiting downtime of the application to an acceptable downtime.

In a preferred embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other types of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

System Architecture

Figure 1:
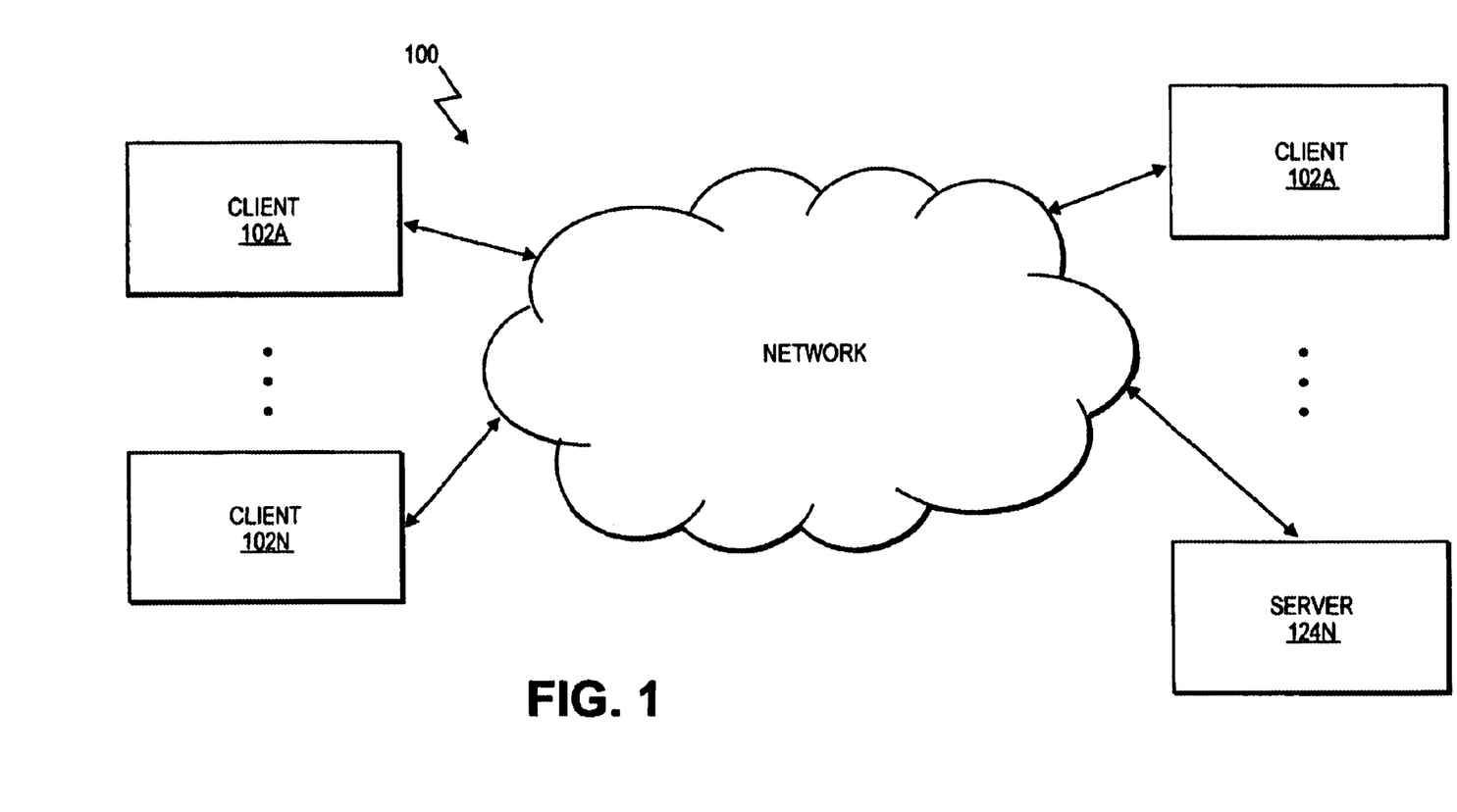
FIG. 1 is a simplified view of an exemplary client-server environment in which the present invention may be implemented.

FIG. 1 is a simplified view of an exemplary client server environment 100 in which the teachings of the present invention may be implemented. The terms "client" and "server" are used to refer to a computer's general role as a requestor of data ("the client") or provider of data ("the server"). Clients 102 (102A, ..., 102N) and servers 124 (124A, ..., 124N) communicate using a network communications protocol. The client server model is used to communicate information between clients 102 and servers 130. Servers 130 are coupled to a network 120, for example, an intranet or the Internet, and respond to data requests and/or other queries from clients. However, a failure of the server 130 will cause the client 102 to lose all access to data provided by an application while running on the server 130. In accordance with the client-server environment depicted in FIG. 1, an apparatus 110 is provided for increasing the availability of an application during a fail-back from a secondary site 170 to a primary site 130 following a failure at the primary site 130.

Figure 2:
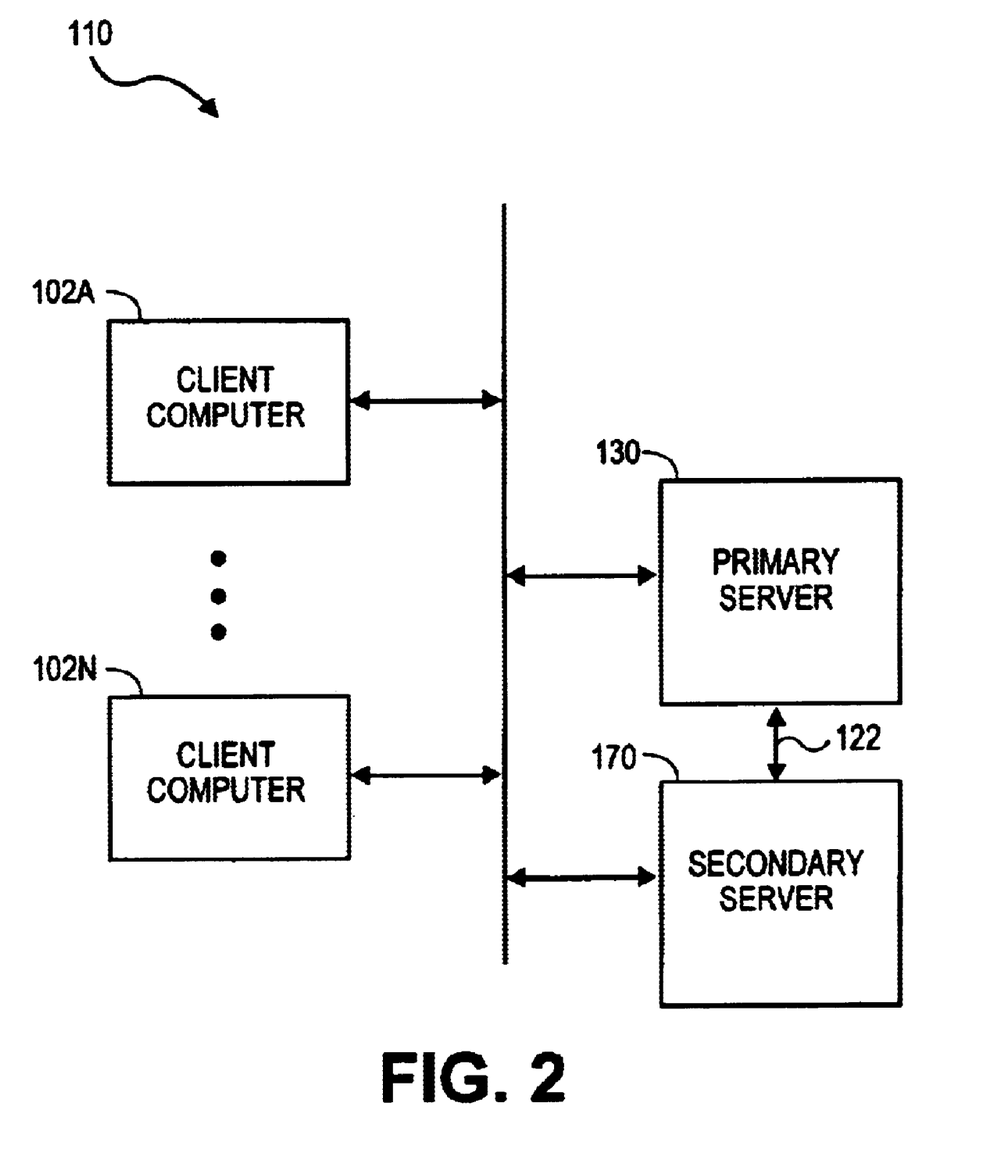
FIG. 2 depicts an exemplary high-level system architecture implementation of the present invention.

According to a first embodiment of the present invention as depicted in FIG. 2, the apparatus 110 includes one or more client computers 102 (102A, ..., 102N), a primary server 130 and a secondary server 170. The primary server computer 130 and the secondary computer server 170 are connected by a communications link 120 to the one or more client computers 102. The communications link 120 generally refers to any type of wire or wireless link between computers, such as, but not limited to, a local area network, a wide area network or a combination of networks. The primary server computer 130 and a secondary server computer 170 are also connected via a server communications link 122. In a preferred embodiment of the present invention, the communications link 120 can be a network such as a corporate intranet or by a Wide Area-Network. The server communications link 122 is preferably a wire or wireless link between the primary 130 and secondary 170 server computers. A client computer 102 can be any type of computing device, such as, but not limited to desktop computers, workstations, laptops and/or mainframe computers. One or more users, not shown, can be associated with each client computer 102.

Figure 3:
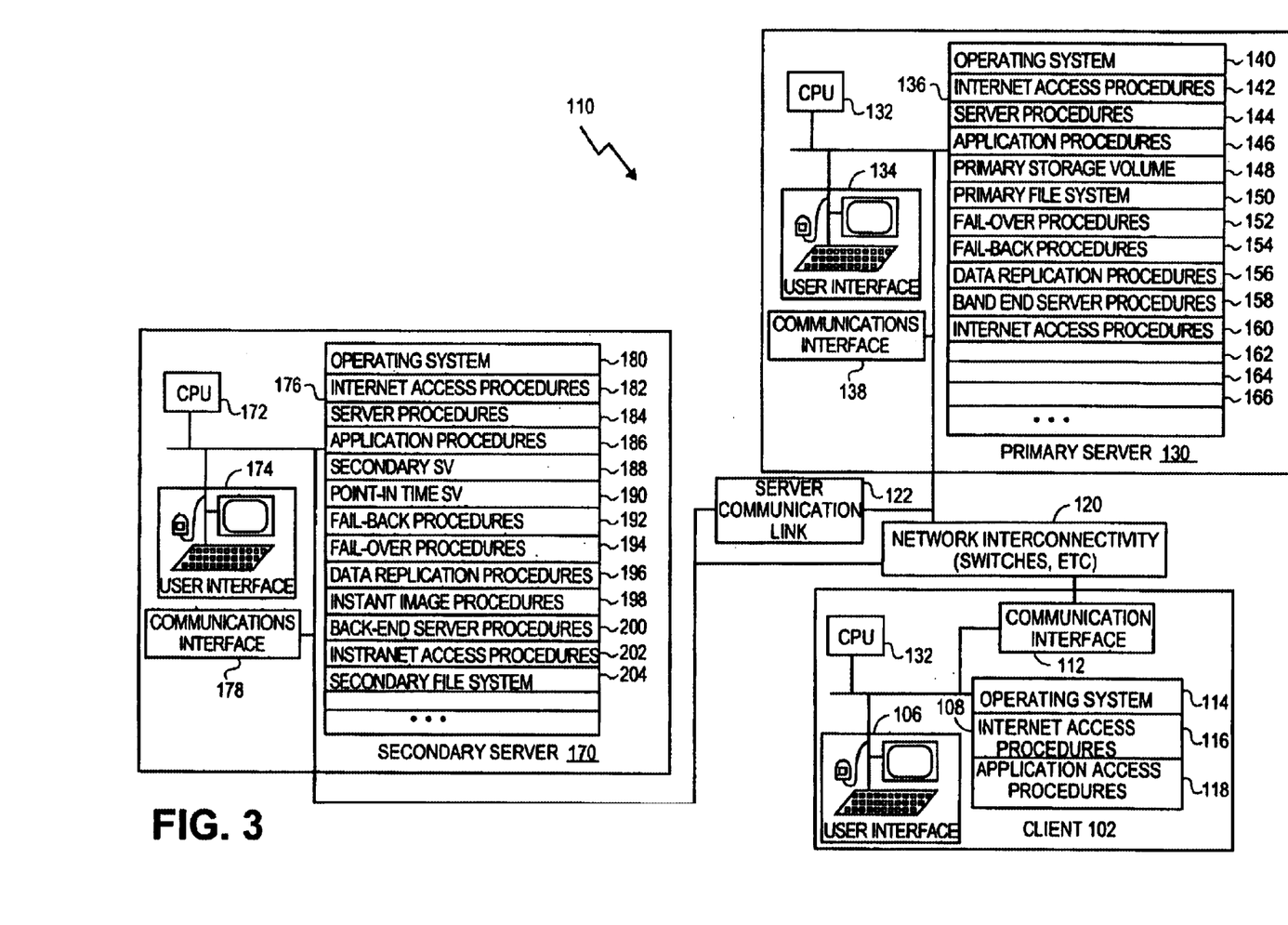
FIG. 3 is a block diagram of a client computer, a primary server computer and a secondary server computer as shown in FIG. 2.

FIG. 3 illustrates the client computer 102, which includes a CPU 104, a user interface 106, a memory 108 and a communications interface 112. The communications interface 112 is used to communicate with the primary server computer 130, or the secondary server computer 170 during a failure of the primary server computer, as well as other system resources not shown. The communications interface 112 provides a network connection that is preferably a high speed or broad band data connection. The memory of the client computer 102 may be implemented as RAM (random access memory) or a combination of RAM and non-volatile memory such as a magnetic disk storage. The memory preferably contains magnetic disk storage. The memory 108 can contain the following:

an operating system 114;
Internet access procedures or network access procedures 116;
application access procedures 118;
as well as other procedures and files.

FIG. 3 also illustrates the primary server computer 130, which includes a central processing unit ("CPU") 132, a user interface 134, a memory 136 and a communications interface 138. The primary server computer 130 can be any type of computing device, such as, but not limited to, desktop computers, workstations, laptops and/or mainframe computers. The communications interface 138 is used to communicate with the client computers 102, and the secondary server computer 170, as well as other system resources not shown. The memory 136 of the primary server computer 130 may be implemented as RAM (random access memory) or a combination of RAM and non-volatile memory such as one or more magnetic disk storage units, or redundant array of independent disk (RAID) groups or arrays of daisy chained disk-storage units. Memory 118 can contain the following:

- an operating system 140;
- Internet or network access procedures 142;
- server procedures 144;
- application procedures 146 that allow the primary server computer 130 to run the application;
- a primary storage volume 148 including, for example, an application database containing data updated and processed by the application or an application file system 150 updated by the application;
- fail-over procedures 152 for failing over to the secondary computer 170 in the event of a failure of the primary server computer 130;
- fail-back procedures 154 for returning control to the primary server computer 130 following a fail-back to the secondary server computer 170;
- data replication procedures 156 for replicating data generated by the application while running on the primary site to secondary storage volumes at the secondary server computer 170;
- back-end server procedures 158;
- Intranet access procedures 160; and
- other procedures and data structures.

FIG. 3 also illustrates the secondary server computer 170, which includes a central processing unit ("CPU") 172, a user interface 174, a memory 176 and a communications interface 178. The secondary server computer 170 can be any type of computing device, such as, but not limited to desktop computers, workstations, laptops and/or mainframe computers. The communications interface 178 is used to communicate with the client computers 102 and the primary server computer 130, as well as other system resources not shown. The memory 176 of the secondary server computer 170 may be implemented as RAM (random access memory) or a combination of RAM and non-volatile memory, such as one or more magnetic disk storage units, RIAD groups, or arrays of daisy chained disk storage units. Memory 176 can contain the following:

- an operating system 180;
- Internet access procedures 182;
- server procedures 184;
- application procedures 186 for running the application on the secondary server computer 170;
- a secondary storage volume 188 including, for example, a secondary application database containing replicated data generated by the application while running on the primary server computer 130 or a secondary application file system 204 containing the replicated data;
- a point-in-time storage volume 190, including, for example, a database or file storage system containing a point-in-time image of data stored on the secondary storage volumes 180 of the secondary server computer 170;
- fail-back procedures 192 for returning control to the primary server computer 130 following a fail-over from the primary server computer 130 to the secondary server computer 170;
- fail-over procedures 194 for bringing up the application on the secondary server 170 following a failure of the primary server computer 130;
- data replication procedures 196 for replicating data to the secondary storage volumes 188 of the secondary server computer 170 generated by the application while running on the primary server computer 130;
- instant image procedures 198 for generating a point-in-time image of data stored on the secondary storage volumes of the secondary server computer 170;
- back-end server procedures 200;
- Intranet access procedures 202; and
- other procedures and data structures.

The storage volumes (148, 188 and 190), as described above, can include, for example, one or more disk storage units, or grouping of daisy chained disk storage units including RAID groups. Procedural method steps for implementing the application maximization techniques during disaster fail-back as described by the present invention are now provided.

Operation

Figure 4A:
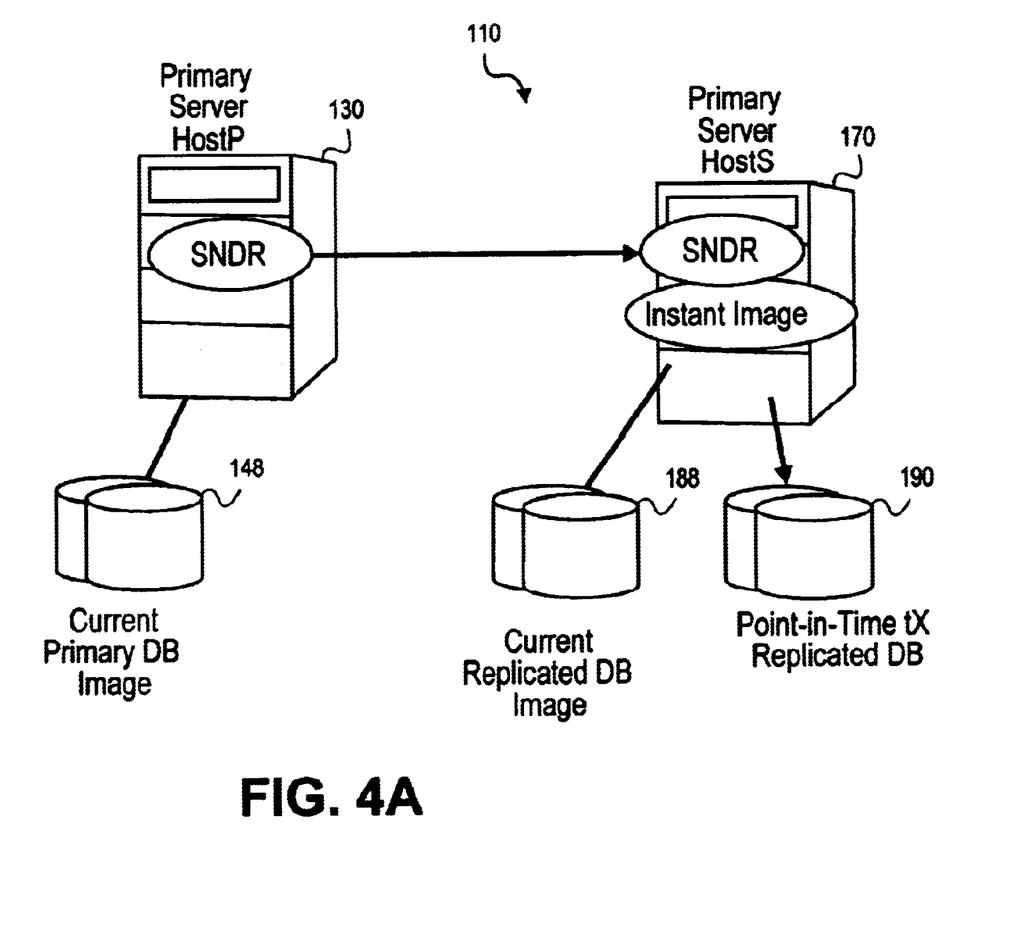
FIG. 4A depicts high level system architecture components in which inventive steps for replicating data may be implemented according to an embodiment of the present invention.
Figure 4B:
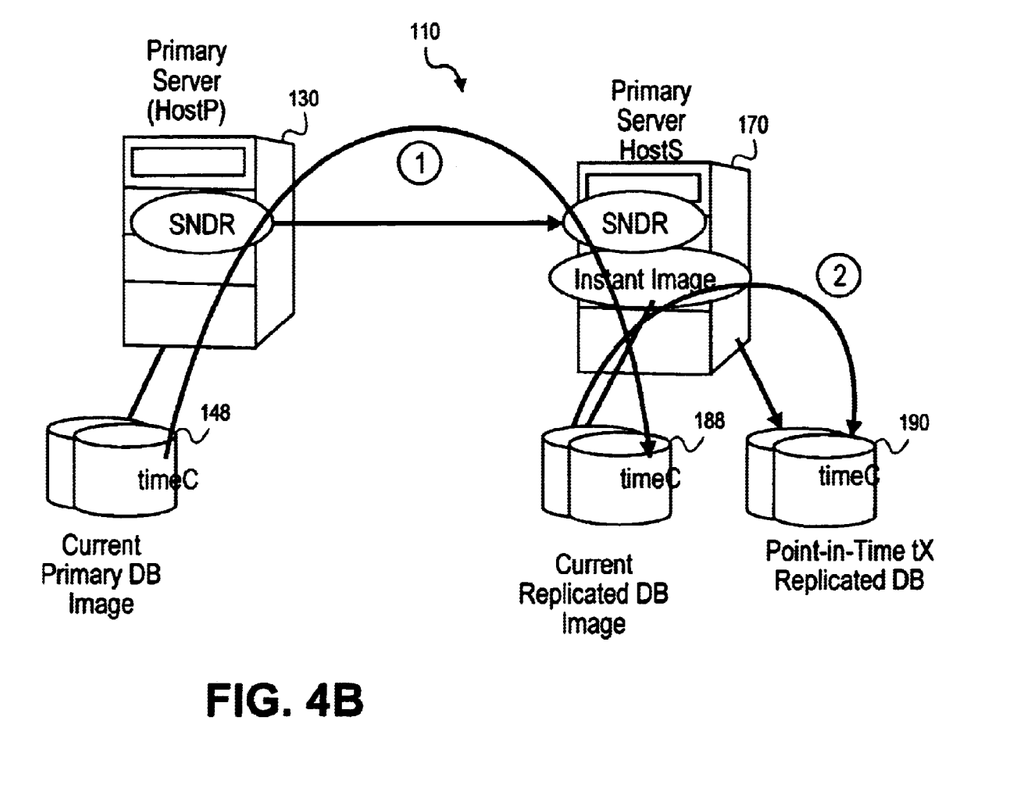
FIG. 4B depicts high level system architecture components in which inventive steps for generating a point-in-time image of replicated data may be implemented according to an embodiment of the present invention.
Figure 4C:
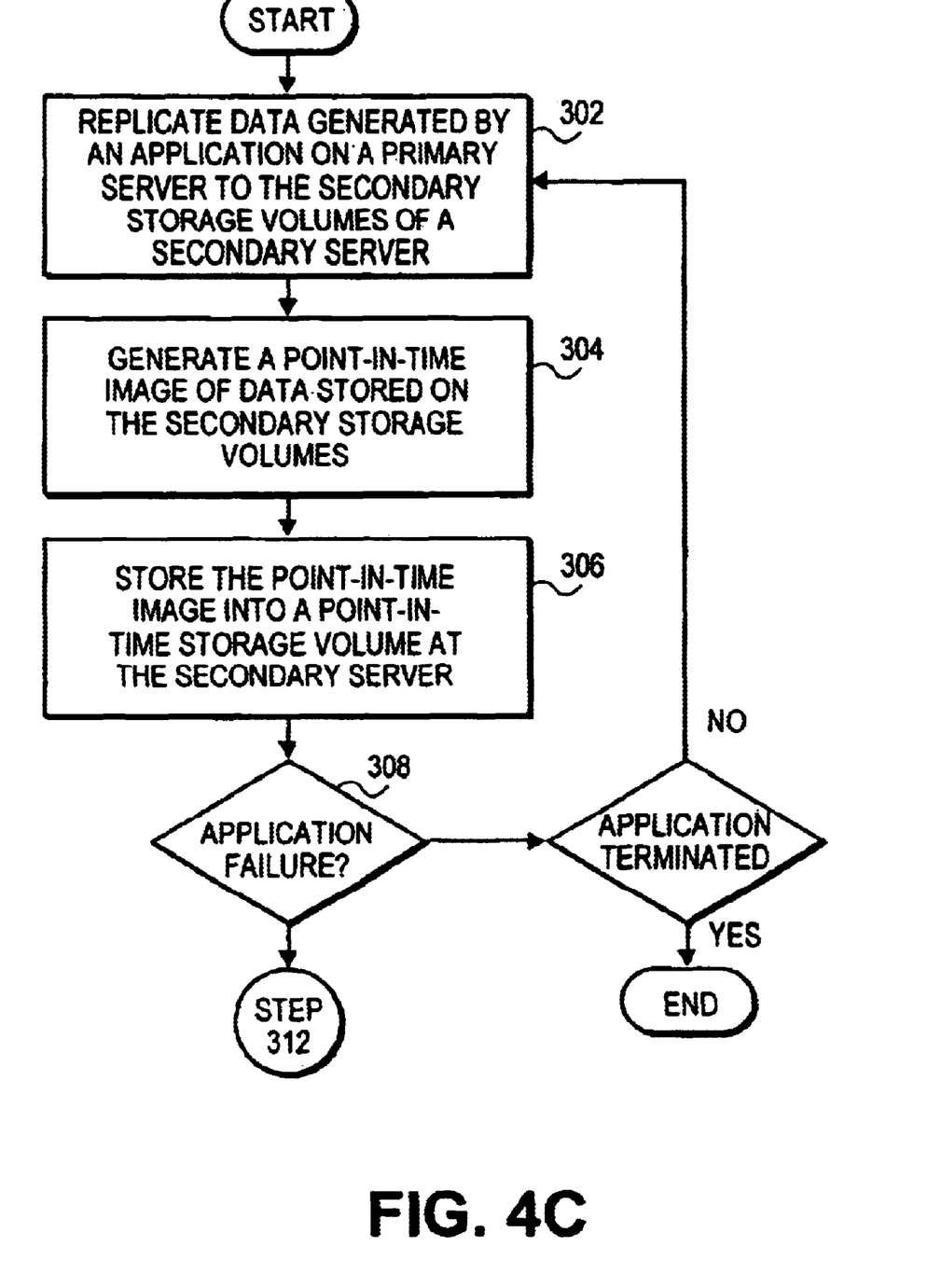
FIG. 4C depicts a flow diagram illustrating data replication and instant image generation of the replicated data according to an embodiment of the present invention.

Referring now to FIG. 4C, a method 300 is depicted for replicating data from the primary server computer 130 to the secondary server computer 170, for example, in the apparatus 110 as depicted in FIGS. 2, 3 and 4A. During normal operation, an application (not shown) runs on the primary server computer 130. At step 302, data generated by the application while running on the primary server computer 130 is replicated to the secondary storage volumes 188 of the secondary server computer 170. The data is replicated from the primary storage volumes 148 to the secondary storage volumes 188 using StorEdge network data replication ("SNDR") software, such that using a fast re-synchronization process, blocks modified on the primary storage volumes 148 are immediately replicated to the secondary storage volumes 188. However, the data may be replicated using other conventional software techniques as known in the art.

Resynchronization of data from a first storage volume to a second storage volume, as described herein, refers to a process which updates data as needed on the second storage volume (fast-resynchronization). However, if all data on the second storage volume is lost, for example due to a disaster, the resynchronization process transfers all data from the first storage volume to the second storage volume (full-resynchronization).

Referring now to FIG. 4B, at step 304, a recoverable, point-in-time image ("PIT") of the data stored on the secondary storage volumes 188 of the secondary server computer 170 is generated. The recoverable PIT copy of the data stored on the secondary storage volumes 188 is periodically generated using StorEdge instant image ("II") software. The SNDR software and the II software are Sun StorEdge products that run on the Solaris operating system available from Sun Microsystems, Inc. Finally, at step 306, the recoverable point-in-time image is stored in a point-in-time storage volume 190 of the secondary site 170. This process is repeated until an application failure occurs or the application is terminated.

Figure 5A:
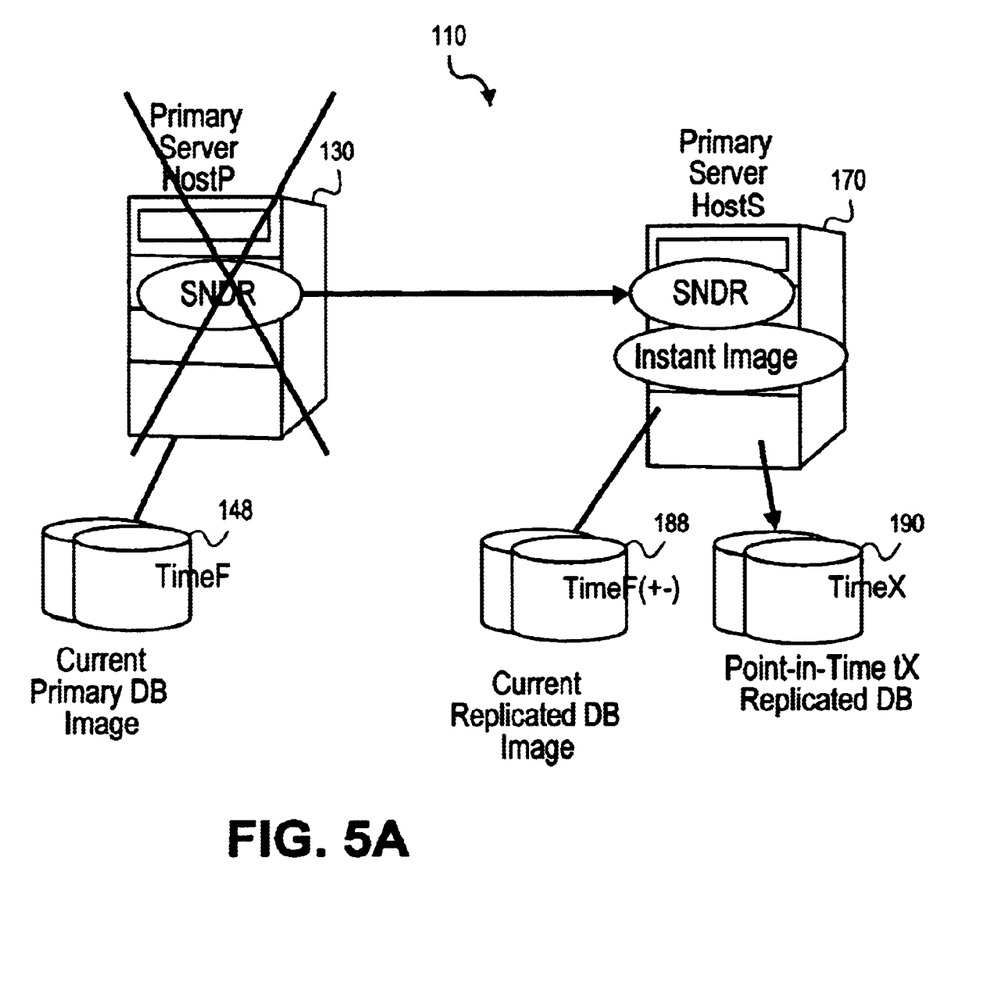
FIG. 5A depicts high level system architecture components in which inventive steps for failing-over from a primary site to a secondary site may be implemented according to a further embodiment of the present invention.
Figure 5B:
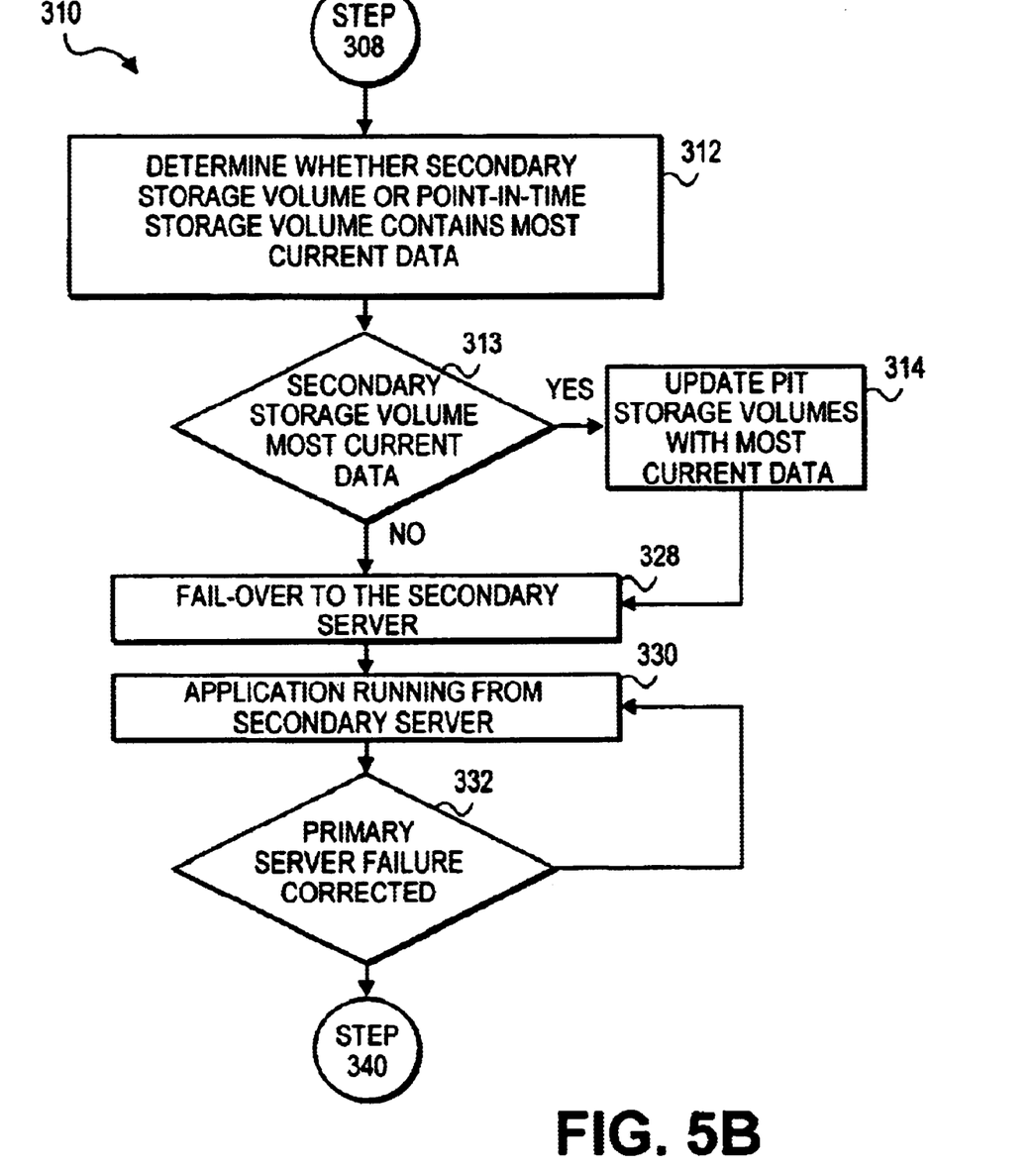
FIG. 5B is a flow diagram illustrating steps for failing-over from a primary server computer to a secondary server computer following a failure of the primary server computer according to a further embodiment of the present invention.
Figure 6:
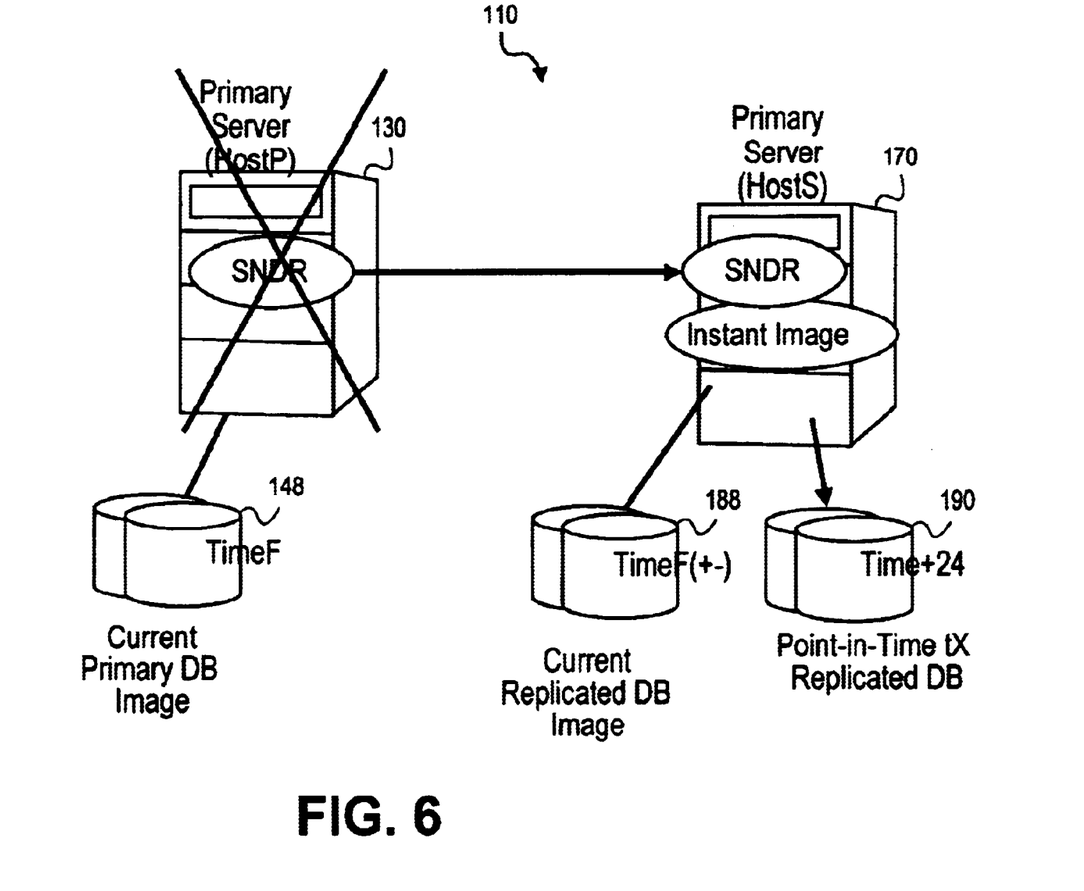
FIG. 6 depicts high level system architecture components illustrating updating of active storage volumes by an application while running on the secondary server computers according to a further embodiment of the present invention.

Referring now to FIG. 5B, a method 310 is depicted for performing a fail-over from the primary server 130 to the secondary server 170 following a failure of the primary server 130, for example, in the apparatus 10 as depicted in FIGS. 5A and 6. If a failure of the primary server 130 is detected, operations of the apparatus 110 and the application fail-over to the secondary server 170 as depicted in FIG. 5A. The fail-over process begins at step 312 where it is determined whether the point-in-time storage volume 190 or the secondary storage volume 180 of the secondary server 170 contains the most current or the most appropriate/consistent copy of the data on the primary storage volume 148 of the primary server 130. At step 314, when the secondary storage volume 188 contains the most current copy of the data on the primary storage volume 148, the point-in-time storage volumes 190 are updated with the most current copy of the data. For example, as depicted in FIG. 5A, the secondary storage volumes contain the most current copy of the data (timeF (+−). Finally, at step 328, the fail-over to the secondary server 170 is completed by bringing up the application on the point-in-time storage volumes 190 (step 330) of the secondary site 170. Once the fail-over process is complete, the application runs on the secondary server 170 and updates the point-in-time storage volumes 190 as depicted in FIG. 6. This process (running the application on the secondary server 170) continues until the primary server 130 failure is corrected at step 332. The secondary storage volumes (Instant Image Master Volumes) 188, are updated using the fast resynchronization process as described above. During normal operation, blocks that have been modified on the secondary storage volume are noted via a scoreboard/bit map mechanism, contrary to the replication process of step 302.

Figure 5C:
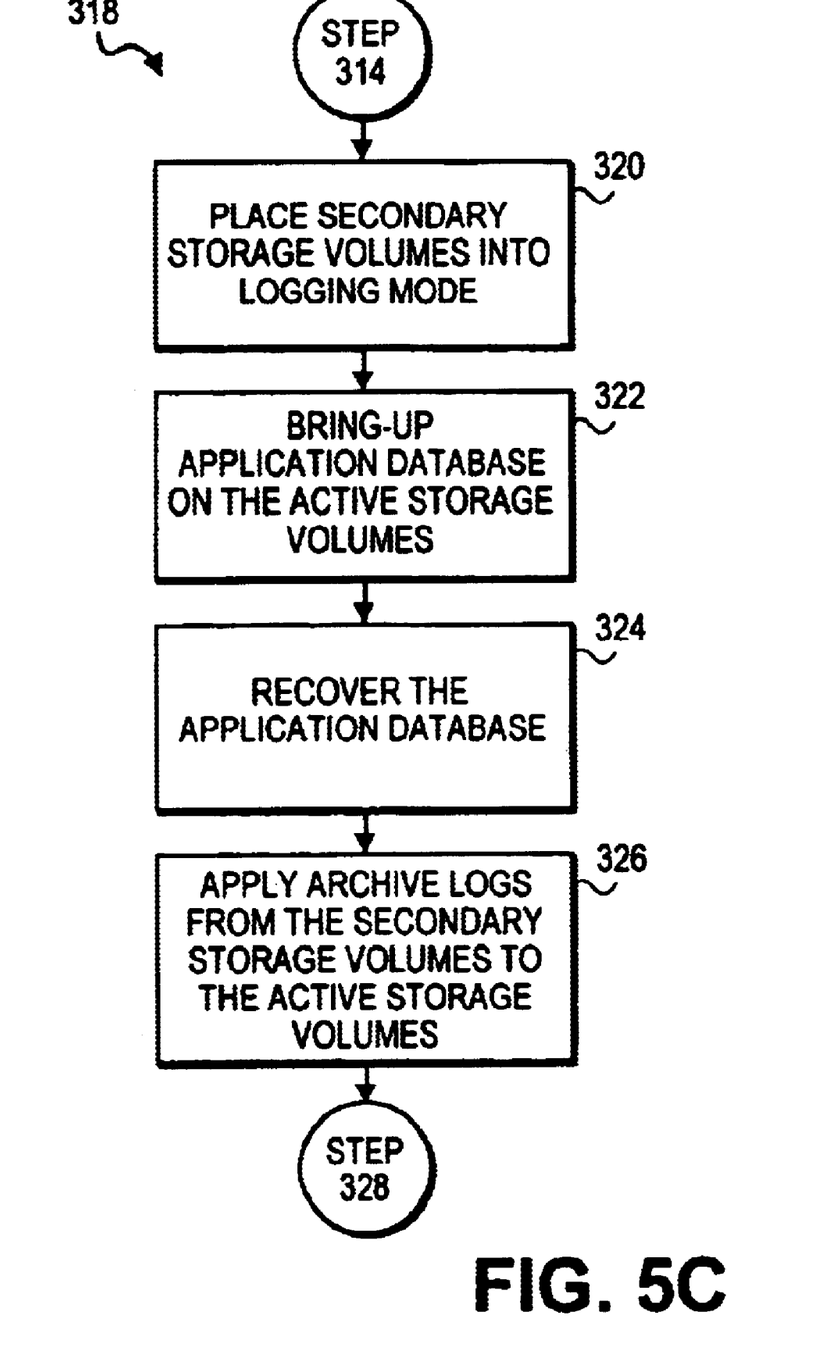
FIG. 5C is a flow diagram illustrating additional method steps for failing-over from the primary server computer to the secondary server computer as described with reference to FIG. 5B.

FIG. 5C depicts additional method steps 318 for performing the updating operations of step 314. At step 320, the secondary storage volumes 188 are placed into a logging mode. At step 322, an application database is brought up on the active storage volumes 190. At step 324, the application database is recovered. Finally, at step 326 archive logs from the secondary storage volumes 188 are applied to the active storage volumes 190. This process synchronizes the application database with the data contained in the primary storage volumes 148 prior to the failure. Although the method 318 for performing the updating operations of step 314 is described with reference to an application database, those skilled in the art will appreciate that additional data storage technologies, including but not limited to databases, file storage systems or other data storage means, are within the contemplation of the present invention.

Figure 7A:
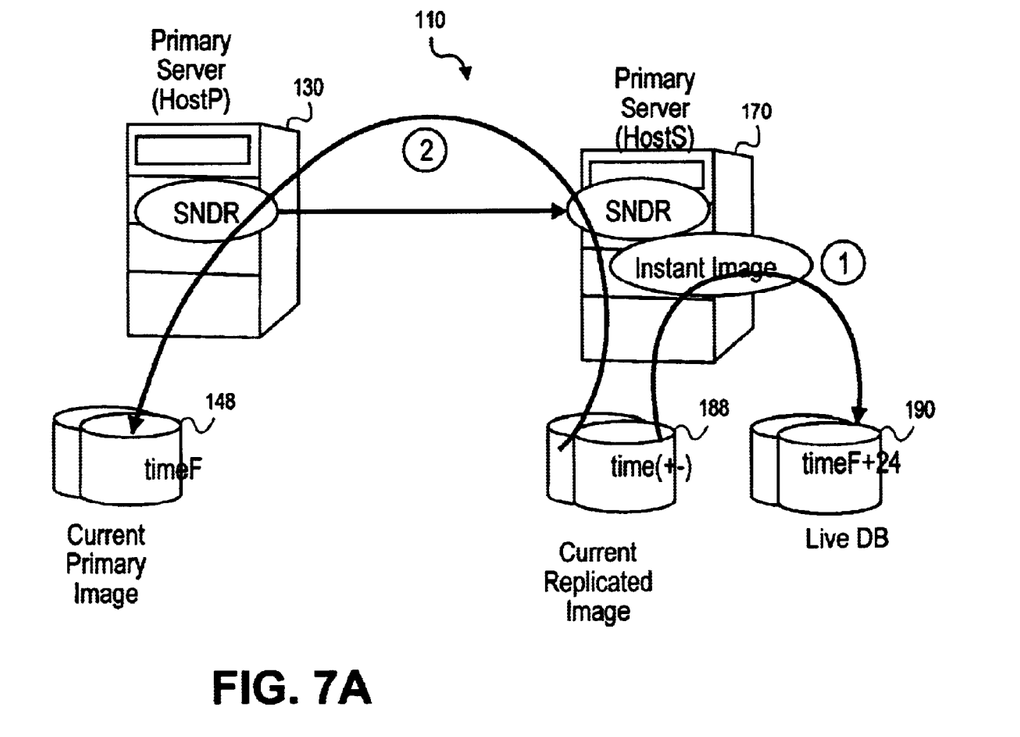
FIG. 7A depicts high level system architecture components in which inventive steps for failing-back from the secondary server computer to the primary server computer according to an exemplary embodiment of the present invention.
Figure 7B:
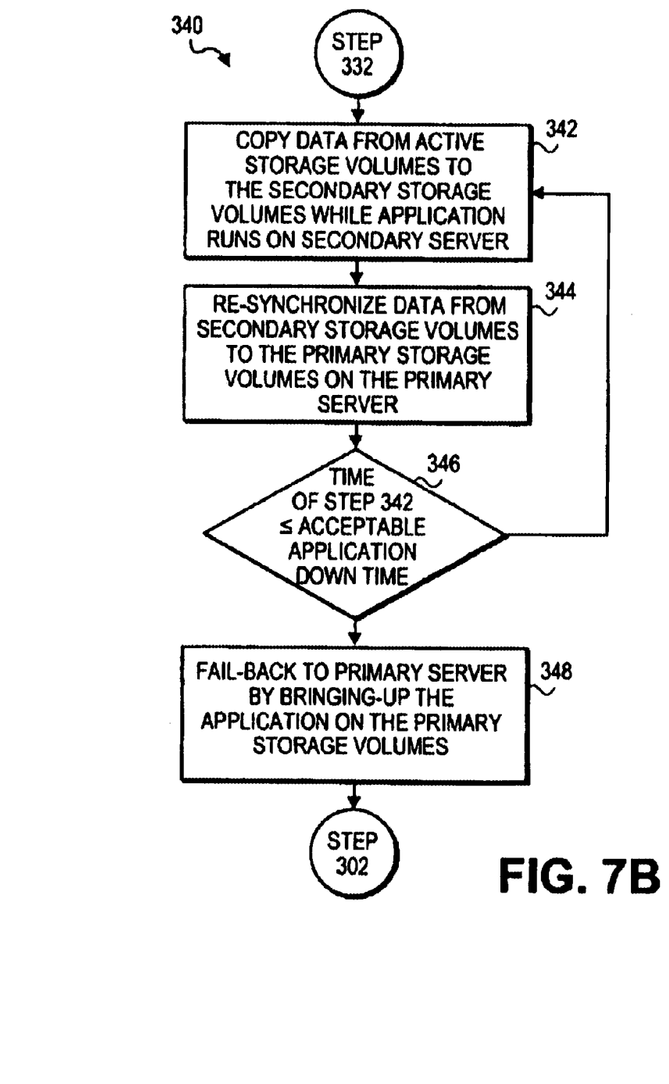
FIG. 7B is a flow diagram illustrating inventive steps for failing-back from a secondary server computer to a primary server computer according to an exemplary embodiment of the present invention.

Once the problem which caused the initial failure of the primary server 130 is corrected, it is necessary to schedule a time to fail-back operations from the secondary server 170 to the primary server 130. Referring now to FIG. 7B, a method 340 is depicted for failing back from the secondary server 170 to the primary server 130, for example, in the apparatus 110 as depicted in FIG. 7A. At step 342, data is copied from the active storage volumes 190 to the secondary storage volumes 188 using the fast re-synchronization process, while the application continues to run on the secondary server and update the active storage volumes 190. At step 344, data is resynchronized from the secondary storage volumes 188 to the primary storage volumes 148 of the primary server 130. When the primary server's disks associated with the primary storage volumes 148 are still intact from before the disaster, only a fast resync, as described above, is required. Otherwise a full resynchronization from the secondary storage volumes 188 to the primary storage volumes 148 is required. At step 346, steps 342 and 344 are repeated for data updated by the application while running on the secondary server 170 until a time required to complete step 344 for resynchronizing the updated data is within an acceptable downtime for the application (final resync). This final resync is performed after the application is shut down on the secondary server 170. Finally, at step 348, fail-back to the primary server 130 is completed by bringing up the application on the primary storage volumes 148 of the primary server 130 once the resynchronization of the updated data is complete. By limiting application downtime to the acceptable downtime, application unavailability is substantially increased. Acceptable down-time for the application is dependant on the specific customer's SLA (as described above).

Figure 7C:
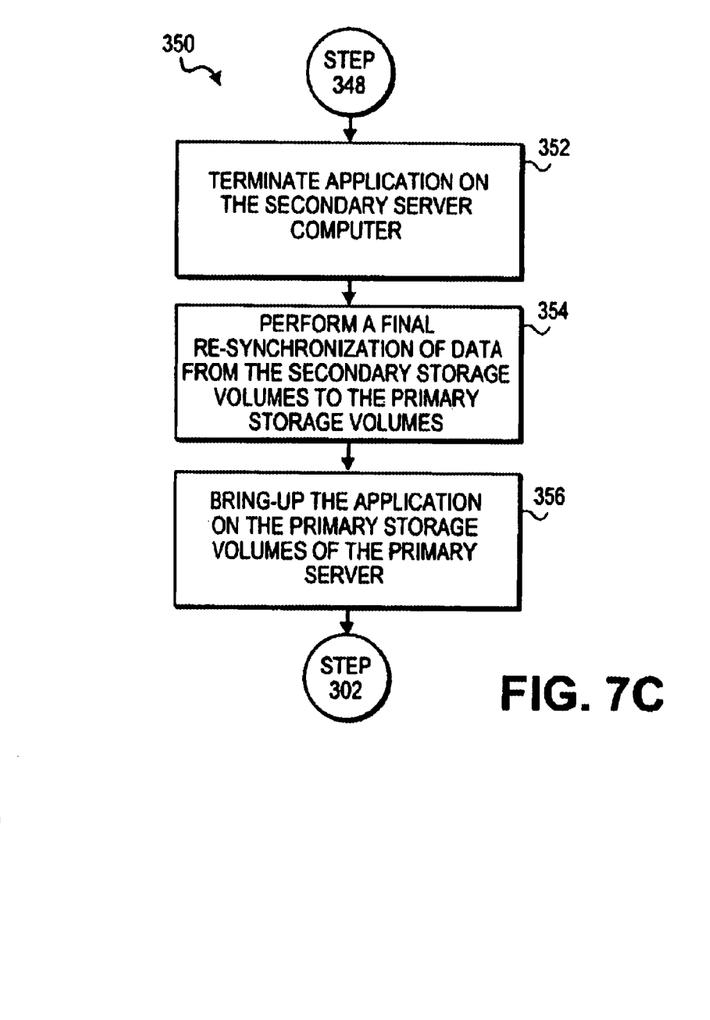
FIG. 7C is a flow diagram illustrating inventive steps for completing the fail-back process from the secondary server computer to the primary server computer as described in FIG. 7B according to an exemplary embodiment of the present invention.

FIG. 7C depicts additional method steps 350 for performing the step 348 of fail-back. At step 352, the application is terminated on the secondary server 170 At step 354, a final resynchronization of data is performed from the secondary storage volumes 188 of the secondary server 170 to the primary storage volumes 148 of the primary server 130. Finally, at step 356, the application is brought online on the primary server 130.

Several aspects of one implementation of the apparatus for increasing availability of an application during a disaster fail-back have been described. However, various implementations of the apparatus provide numerous features including, complementing, supplementing, and/or replacing the features described above. Features can be implemented as part of the server or as part of the user's computer system in different implementations.

It is to be understood that even though numerous characteristics and advantages of various embodiments of the present invention have been set forth in the foregoing description, together with details of the structure and function of various embodiment of the invention, this disclosure is illustrative only. Changes may be made in detail, especially matters of structure and management of parts within the principles of the present invention to the full extent indicated by the broad general meaning of the terms in which the appended claims are expressed. For example, the particular element may vary depending on the particular application for the novel mixed storage format while maintaining substantially the same functionality without departing from the scope and spirit of the present invention.

In addition, although the preferred embodiment described herein is directed to an apparatus and method for increasing availability of an application, it will be appreciated by those skilled in the art that the teaching of the present invention can be applied to other systems. In fact, systems utilizing fail-over and fail-back techniques, regardless of the type of storage volumes (database, file storage, etc.) or the type of apparatus (Internet, corporate Intranet, client-server, etc.) are within the teachings of the present invention, without departing from the scope and spirit of the present invention.

Advantages of the invention include minimizing the impact of application availability when performing a fail-back. The present invention provides a fail-back technique which can be achieved within the minimum of acceptable downtime of the application. Moreover, the technique taught by the present invention eliminates the potential possibility of data loss at a secondary site which occurs when data is merged from a primary site to a secondary site.

Having disclosed exemplary embodiments and the best mode, modifications and variations may be made to the disclosed embodiments while remaining within the scope of the invention as defined by the following claims.

What is claimed is:

1. A method for increasing application availability during fail-back from a secondary site to a primary site following a failure at the primary site, the method comprising:

copying data from active storage volumes to secondary storage volumes at the secondary site while the application runs on the secondary site and updates the active storage volumes;

re-synchronizing data from the secondary storage volumes of the secondary site to primary storage volumes of the primary site;

repeating the steps of copying and re-synchronizing for data updated by the application until a time required to complete re-synchronizing the updated data is within an acceptable downtime for the application; and failing-back to the primary site by bringing up the application at the primary site once the re-synchronization of the updated data is complete, such that availability of the of the application is increased.

2. The method of claim 1, wherein prior to the step of moving and prior to the failure at the primary site, the method further comprises:

replicating data generated by the application while running on the primary site to the secondary storage volumes at the secondary site;

generating a point-in-time image of data stored on the secondary storage volumes at the secondary site; and storing the point-in-time image into a point-in-time storage volume at the secondary site.

3. The method of claim 1, wherein prior to the step of moving, the method further comprises steps of:

determining whether a point-in-time storage volume or the secondary storage volume at the secondary site contains a most current copy of the data on the primary storage volume at the primary site;

when the secondary storage volumes contain the most current copy of the data on the primary storage volume of the primary site, updating the point-in-time storage volumes with the most current copy of the data; and failing-over to the secondary site by bringing up the application on the point-in-time storage volumes of the secondary site, such that the point-in-time storage volumes function as the active storage volumes of the secondary site.

4. The method of claim 3, wherein the updating further comprises:

placing the secondary storage volumes into a logging mode;

bringing up an application database on the active storage volumes;

recovering the application database; and applying archive logs from the secondary storage volumes to the active storage volumes, such that the application database is synchronized with the data contained in the primary storage volumes prior to the failure.

5. The method of claim 1, wherein failing-back further comprises:

terminating the application at the secondary site;

performing a final re-synchronization of data from the secondary storage volumes of the secondary site to primary storage volumes of the primary site; and bringing the application online at the primary site.

6. The method of claim 1, wherein moving further comprises:

quiescing the application for a specified period in order to generate a consistent and recoverable image of the active storage volumes prior to moving the data to the secondary storage volumes.

7. An apparatus for increasing application availability during a disaster fail-back, the apparatus comprising:

a primary site configured to run an application including a primary storage volume that contains data processed by the application;

a secondary site including a secondary storage volume and a point-in-time storage volume, the secondary site configured to replicate the data contained in the primary storage volume to the secondary storage volume and generate a point-in-time image of data stored on the secondary storage volumes that is stored into the point-in-time storage volumes; and a fail-back procedure having a capability to fail-back from the secondary site to the primary site following a fail-over to the secondary site by bringing up the application at the primary site once data updated by the application while running at the secondary site is re-synchronized from the secondary storage volumes of the secondary site to the primary storage volumes of the primary site, thereby increasing application availability during disaster fail-back.

8. The apparatus of claim 7 wherein the primary site includes a web server;

wherein the secondary site includes a backup web server;

wherein the primary storage volume includes a file server system containing the data processed by the application while running on the web server; and wherein the secondary storage volume includes a backup file server system containing data replicated from the file server system of the web server at the primary site.

9. The apparatus of claim 7, wherein the primary site comprises a network server and wherein:

the primary storage volume further comprises an application database containing the data processed by the application while running on the network server;

the secondary storage volume further comprises a backup application database containing data replicated from the application database of the primary site; and the point-in-time storage volume further comprises an image application database containing a snapshot of the data contained in the backup database of the primary site.

10. The apparatus of claim 7, further comprising:

a fail-over procedure having a capability to populate an active storage volume at the secondary site with data replicated from the primary storage volume of the primary site and bring-up the application on the active storage volume at the secondary site in response to detection of a failure of the primary site.

11. The apparatus of claim 7, further comprising:

a data replication procedure having a capability to replicate data generated by the application while running on the primary site to the secondary storage volumes at the secondary site, generate a point-in-time image of data stored on the secondary storage volumes at the secondary site and store the point-in-time image into the point-in-time storage volume at the secondary site.

12. The apparatus of claim 7, wherein the fail-back procedure includes a capability to move data from active storage volumes to the secondary storage volumes at the secondary site while the application runs on the secondary site and updates the active storage volumes, re-synchronize data from the secondary storage volumes of the secondary site to the primary storage volumes of the primary site and bring-up the application at the primary site once the re-synchronization of data updated by the application while running at the secondary site is complete, such that availability of the application is increased.

13. A computer readable storage medium containing programmed instructions that direct a computer to perform method for increasing application availability during fail-back from secondary site to a primary site following a failure at the primary site, the method comprising:

moving data from active storage volumes to secondary storage volumes at the secondary site while the application runs on the secondary site and updates the active storage volumes;

re-synchronizing data from the secondary storage volumes of the secondary site to primary storage volumes of the primary site;

repeating the moving and the re-synchronizing instructions for data updated by the application until a time required to complete the re-synchronizing instruction for the updated data is within an acceptable downtime for the application; and failing-back to the primary site by bringing up the application at the primary site once the re-synchronization of the updated data is complete, such that availability of the of the application is increased.

14. The computer readable storage medium of claim 13, wherein prior to moving and prior to the failure at the primary site, the method further comprises:

replicating data generated by the application running on the primary site to the secondary storage volumes at the secondary site;

generating a point-in-time image of data stored on the secondary storage volumes at the secondary site; and storing the point-in-time image into a point-in-time storage volume at the secondary site.

15. The computer readable storage medium of claim 13, wherein prior to moving, the method further comprises:

determining whether a point-in-time storage volume or the secondary storage volume at the secondary site contains a most current copy of the data on the primary storage volume at the primary site;

when the secondary storage volumes contain the most current copy of the data on the primary storage volume of the primary site, updating the point-in-time storage volumes with the most current copy of the data; and failing-over to the secondary site by bringing up the application on the point-in-time storage volumes of the secondary site, such that the point-in-time storage volumes function as the active storage volumes of the secondary site.

16. The computer readable storage medium of claim 15, wherein updating further comprises:

placing the secondary storage volumes into logging mode;

bringing up an application database on the point-in-time storage volumes;

recovering the application database; and applying archive logs from the secondary storage volumes, such that the application database is synchronized with the data contained on the primary storage volumes prior to the failure.

17. The computer readable storage medium of claim 13, wherein failing-back further comprises:

terminating the application at the secondary site;

performing a final re-synchronization of data at the secondary storage volumes of the secondary site to primary storage volumes of the primary site; and bringing the application online on the primary server.

18. The computer readable storage medium of claim 13, wherein moving further comprises instructions of:

quiescing the application for a specified period in order to generate a consistent and recoverable image of the active storage volumes prior to moving the data to the secondary storage volumes.

19. An apparatus for increasing application availability during a disaster fail-back, the apparatus comprising:

a web server configured to run an application including a file server system that contains data processed by the application;

a back-up web server including a backup file server system and a point-in-time storage volume, the back-up web server configured to replicate the data contained in the file server system to the backup file server system and generate a point-in-time image of data stored on the backup file server systems that is stored into the point-in-time storage volumes; and a fail-back procedure having a capability to fail-back from the backup web server to the web server following a fail-over to the backup web server by bring up the application at the web server once data updated by the application while running at the backup web server is re-synchronized from the backup file server systems of the backup web server to the file server systems of the web server, thereby increasing application availability during disaster fail-back.

20. The apparatus of claim 19, wherein the web server comprises a network server and wherein:

the file server system further comprises an application database containing the data processed by the application while running on the network server;

the backup file server system further comprises a backup application database containing data replicated from the application database of the web server; and the point-in-time storage volume further comprises an image application database containing a snapshot of the data contained in the backup database of the web server.

21. The apparatus of claim 19, further comprising:

a fail-over procedure having a capability to populate an active storage volume at the backup web server with data replicated from the file server system of the web server and bring-up the application on the active storage volume at the backup web server in response to detection of a failure of the web server.

22. The apparatus of claim 19, further comprising:

a data replication procedure having a capability to replicate data generated by the application while running on the web server to the secondary storage volumes at the backup web server, generate a point-in-time image of data stored on the backup file server systems at the backup web server and store the point-in-time image into the point-in-time storage volume at the backup web server.

23. The apparatus of claim 19, wherein the fail-back procedure includes a capability to move data from active storage volumes to the backup file server systems at the backup web server while the application runs on the backup web server and updates the active storage volumes, re-synchronize data from the backup file server systems of the backup web server to the file server systems of the web server and bring-up the application at the web server once the re-synchronization of data updated by the application while running at the backup web server is complete, such that availability of the application is increased.

\* \* \* \* \*